R. C. Whitehouse. Culinary Boiler.
117356      PATENTED JUL 25 1871
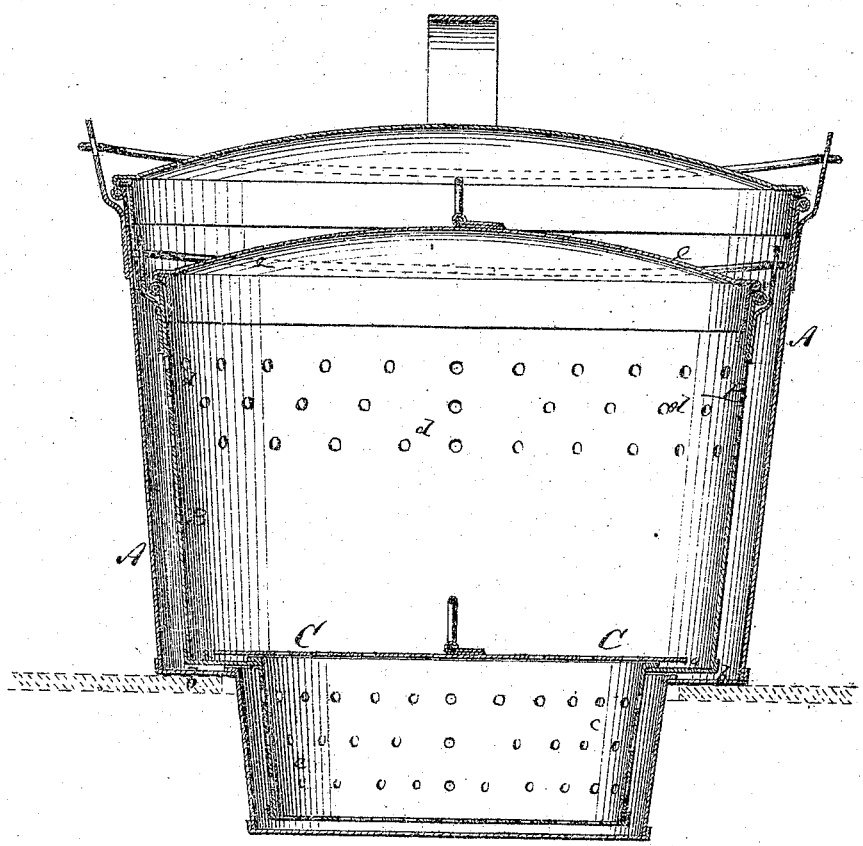
Witnesses:
E. Wolff
Wm. H. C. Smith
Inventor:
R. C. Whitehouse
PER Munn & Co
Attorneys.

UNITED STATES PATENT OFFICE.

RALPH C. WHITEHOUSE, OF HODGDON'S MILLS, MAINE.

IMPROVEMENT IN CULINARY BOILERS.

Specification forming part of Letters Patent No. 117,356, dated July 25, 1871.

*To all whom it may concern:*

Be it known that I, RALPH C. WHITEHOUSE, of Hodgdon's Mills, in the county of Lincoln and State of Maine, have invented a new and Improved Culinary Boiler; and I do hereby declare that the following is a full, clear, and exact description thereof, which will enable others skilled in the art to make and use the same, reference being had to the accompanying drawing forming part of this specification, in which the drawing represents a vertical central section of my improved culinary boiler.

This invention relates to a new self-draining kettle and strainer for boiling or steaming vegetables, fruit, meat, &c.; and consists in the use within an ordinary kettle of an inner vessel perforated at the bottom and near the top, and in the combination therewith of a removable false bottom for steaming purposes.

A in the drawing represents a culinary boiler of suitable construction and arrangement. B is a vessel made of sheet or cast metal, smaller than the vessel A, so that it will fit into the same. The shoulder $a$ of the vessel B rests on the shoulder $b$ of A, as shown. The lower part of the inner kettle B is perforated at $c$, as shown, and its upper part, close below the cover $e$, is also perforated, as at $d$. The main body of the inner kettle, however, above the shoulder $a$, is not perforated, so that its contents may remain whole and will not be disintegrated by the boiling process. C is a false perforated bottom placed upon the shoulder $a$ to keep the contents from the water when they are to be steamed. The upper apertures of the kettle B prevent the water from boiling over the top, and allow it to escape without raising the cover. The inner kettle will always be self-draining, as all water escapes as quick as it is raised out of the boiler A.

Having thus described my invention, I claim as new and desire to secure by Letters Patent—

A boiler, A $b$ $b$, combined with an internal vessel, B $a$ $a$, having the perforated bottom C, through which steam is admitted, and the side perforations $d$ just below the cover for the exit thereof, in order to adapt the same culinary vessel either to the boiling or steaming of vegetables.

RALPH C. WHITEHOUSE.

Witnesses:
  J. O. SEAVEY,
  GEORGE A. McGUNIGLE.